United States Patent [19]

Takashima

[11] Patent Number: 5,175,408
[45] Date of Patent: Dec. 29, 1992

[54] ELECTRICAL DISCHARGE MACHINE

[75] Inventor: Hidenori Takashima, Kamakura, Japan

[73] Assignee: Fanuc Ltd, Minamitsuru, Japan

[21] Appl. No.: 499,440

[22] PCT Filed: Oct. 19, 1989

[86] PCT No.: PCT/JP89/01075
 § 371 Date: Jun. 22, 1990
 § 102(e) Date: Jun. 22, 1990

[87] PCT Pub. No.: WO90/04480
 PCT Pub. Date: May 3, 1990

[30] Foreign Application Priority Data
 Oct. 29, 1988 [JP] Japan .............................. 63-271962

[51] Int. Cl.$^5$ .................... B23H 1/10; B23H 7/02; B23H 7/36; B23H 11/00
[52] U.S. Cl. .................... 219/69.14; 219/69.12
[58] Field of Search .............. 219/69.14, 69.13, 69.11, 219/69.12, 69.19; 364/474.04

[56] References Cited

U.S. PATENT DOCUMENTS

| | | | |
|---|---|---|---|
| 4,521,661 | 6/1985 | Inoue | 219/69.12 |
| 4,667,077 | 5/1987 | Goto | 219/69.12 |
| 4,685,064 | 8/1987 | Kinoshita et al. | 364/474.04 |

FOREIGN PATENT DOCUMENTS

| | | | |
|---|---|---|---|
| 2007484 | 6/1983 | Fed. Rep. of Germany | 219/69.14 |
| 57-43932 | 3/1982 | Japan | |
| 58-10429 | 1/1983 | Japan | 219/69.14 |
| 109230 | 6/1983 | Japan | 219/69.14 |
| 206313 | 12/1983 | Japan | 219/69.13 |
| 152025 | 8/1984 | Japan | 219/69.14 |
| 259335 | 12/1985 | Japan | 219/69.11 |
| 148123 | 7/1987 | Japan | 219/69.11 |
| 8401734 | 5/1984 | PCT Int'l Appl. | 219/69.13 |

OTHER PUBLICATIONS

EDM Digest, pp. 4-5, Oct./1983, vol. 5, No. 5, advertisement by JAPAX.
EDM Digest, pp. 28-29, Feb. 1984, vol. 6, No. 1, advertisement by REMCOR.

*Primary Examiner*—Geoffrey S. Evans
*Attorney, Agent, or Firm*—Staas & Halsey

[57] ABSTRACT

An electrical discharge machine in which the operating state of a machining fluid cooler can be easily ascertained and adjusted. The machining fluid cooler comprises a body disposed on the rear side of a housing of the electrical discharge machine and a panel (21) disposed on the front of a control device (4) which is located at the front side of the electrical discharge machine housing. The panel is provided with a liquid thermometer (15) and a flowmeter (16), which constitute an operation parameter display section of the machining fluid cooler, and a power switch (17), a target temperature setter (18), a target temperture difference setter (19), and an operation mode selector switch (2), which constitute an operating section for operation parameter adjustment of the machining fluid cooler.

5 Claims, 2 Drawing Sheets

ELECTRICAL DISCHARGE MACHINE

TECHNICAL FIELD

The present invention relates to an electrical discharge machine, and more particularly, to a wire-cut electrical discharge machine in which the operating state of a machining fluid cooler can be easily ascertained and adjusted.

BACKGROUND ART

In a wire-cut electrical discharge machine, a machining fluid is supplied from a machining fluid supplying system to the gap between a wire electrode and a workpiece to remove heat and chips produced by the electrical discharge machine. Also, the machining fluid is supplied to the workpiece, a workpiece table, and members surrounding the table to prevent temperature fluctuations of these elements, thereby preventing lowering of machining accuracy attributable to temperature fluctuations of those various elements.

If the machining fluid supplying system is designed so that the used machining fluid can be circulated for reuse after it is cleaned in a disposer, the machining fluid temperature gradually rises after the start of electrical discharge machining, so that the temperature of the workpiece and the like also rises. If the machining fluid temperature fluctuates in this manner, the machining speed also fluctuates, so that the machining accuracy, including surface roughness, is reduced. Conventionally, therefore, a device for cooling the machining fluid is provided to keep the machining fluid temperature constant.

A conventional machining fluid cooler, along with the aforesaid machining fluid disposer, is located on the rear side of a housing of the electrical discharge machine. Further, the machining fluid cooler comprises display sections for displaying various operation parameters of the machining fluid cooler, including the machining fluid temmperature and the amount of machining fluid supply, and operating sections having various operating elements, including power switches and various switches for adjusting the parameters. These display sections and operating sections are located on the rear side of the machine housing. Accordingly, an operator must take the trouble to get behind the machine housing in turning on the power or identifying or adjusting the various operation parameters of the machining fluid cooler. If the electrical discharge machining is started with any of the various operation parameters off or with the power switches and the like off, moreover, it sometimes may not be able to be noticed.

DISCLOSURE OF THE INVENTION

The object of the present invention is to provide an electrical discharge machine in which the operating state of a machining fluid cooler can be easily ascertained and adjusted.

In order to achieve the above object, an electrical discharge machine according to the present invention comprises an electrical discharge machine housing, and a machining fluid cooler including a display section for displaying at least one first operation parameter and an operating section for adjusting at least one second operation parameter, the display section and the operating section of the machining fluid cooler being located on the front side of the electrical discharge machine housing.

Since the display section and the operating section of the machining fluid cooler are located on the front side of the electrical discharge machine housing, as described above, the operating state of the machining fluid cooler can be easily ascertained and adjusted, so that electrical discharge machining can be safely effected under optimum conditions.

BEST MODE OF CARRYING OUT THE INVENTION

Figure 1:
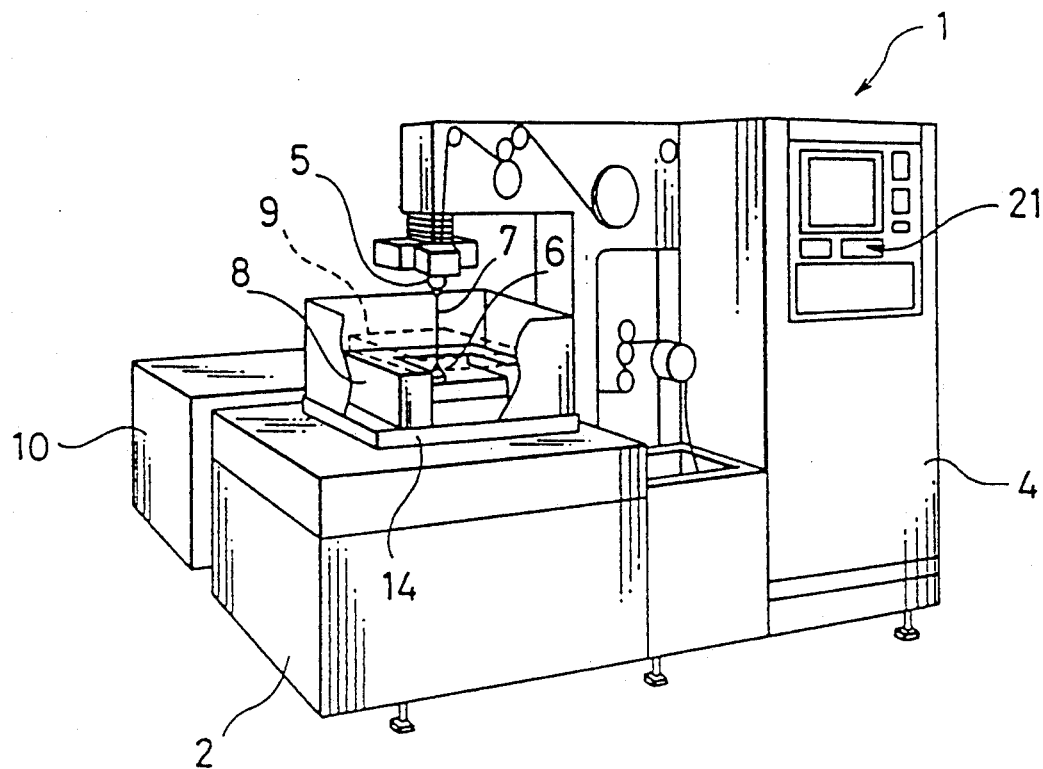
FIG. 1 is a schematic perspective view showing a wire-cut electrical discharge machine according to one embodiment of the present invention.
Figure 2:
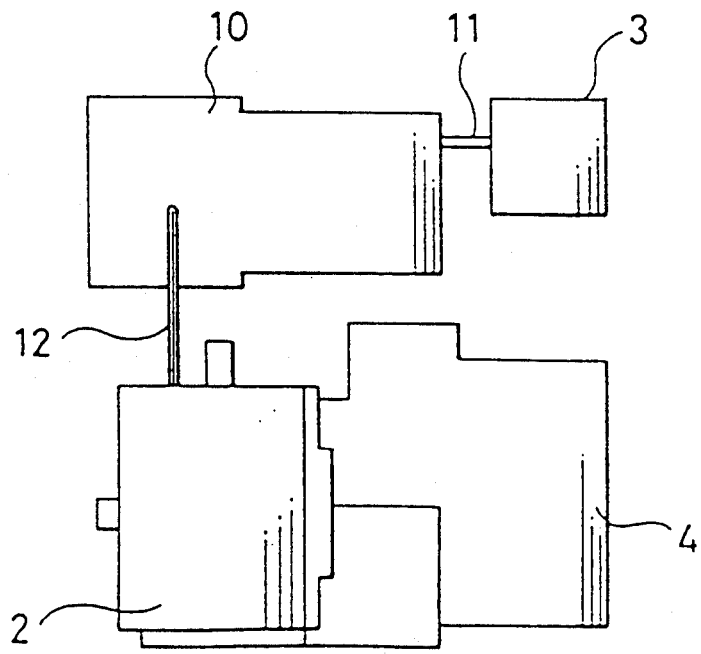
FIG. 2 is a schematic top plan view of the electrical discharge machine of FIG. 1.

Referring to FIGS. 1 and 2, a wire-cut electrical discharge machine 1 according to one embodiment of the present invention comprises an electrical discharge machine housing 2, a machining fluid circulating and supplying system mentioned later, and a control device 4 having a built-in computer. The control device 4 is disposed adjacent to the electrical discharge machine housing 2 so that its front faces in the same direction as the front of the electrical discharge machine housing 2. Under the control of the control device 4, moreover, the electrical discharge machine 1 causes a wire electrode 7 stretched between upper and lower guides 5 and 6 to run along a wire transportation path, and causes electric discharge in the gap between a workpiece 9 on a workpiece table 8 and the wire electrode 7, thereby working the workpiece 9. During the electrical discharge machining, furthermore, a machining fluid is supplied to the electric discharge gap, the workpiece table 8 and its surroundings, and the workpiece 9, through nozzles (not shown) attached individually to the upper and lower guides 5 and 6. Numeral 14 denotes a machining fluid collecting vessel which surrounds the workpiece table 8.

The machining fluid circulating and supplying system includes a machining fluid cooler and a machining fluid disposer 10 which is connected to the electrical discharge machine housing 2 by means of a first duct pair 12 and which is used to clean the used machining fluid. The machining fluid cooler includes a machining fluid cooler body 3 which is connected to the disposer 10 by means of a second duct pair 11 and which is used to cool the machining fluid and adjust the flow rate of the machining fluid. Further, the machining fluid cooler includes a panel 21 which, along with display sections and operating sections of the control device 4, is located on the front of control device 4, that is, on the front side of the electrical discharge machine housing 2. Display sections and operating sections of the machining fluid cooler are arranged on the panel 21. Accordingly, the machining fluid cooler body 3 and the display and operating sections are positioned independently of one another. Consequently, the electrical discharge machine 1 as a whole is compact and does not require a wide installation space, despite the location of the display sections and the operating sections on the front side of the electrical discharge machine housing. The body 3, the display sections, and the operating sections of the machining fluid cooler are connected individually to the control device 4, and machining fluid cooler operation and machining fluid flow rate adjusting operation of the cooler body 3 are controlled in the manner mentioned later by means of the control device 4.

Figure 3:
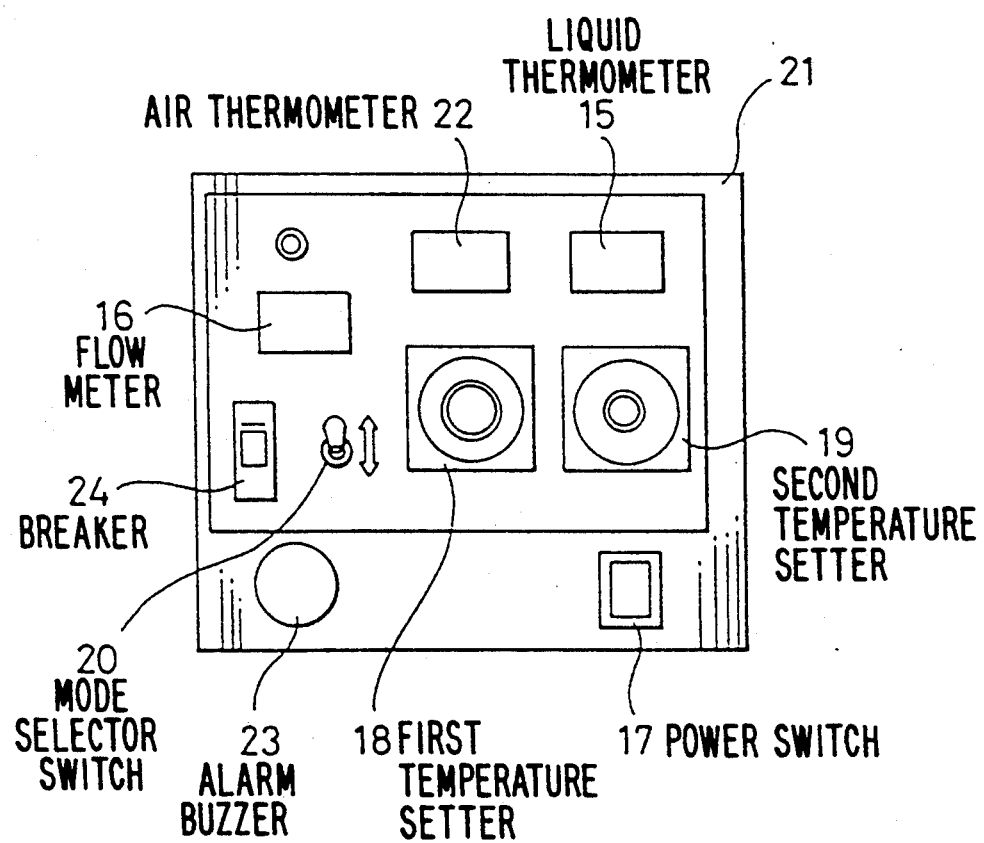
FIG. 3 is a schematic front view showing display sections and operating sections of a machining fluid cooling device attached to the electrical discharge machine of FIG. 1.

As shown in FIG. 3, the display sections of the machining fluid cooler on the panel 21 include a liquid thermometer 15 for indicating the temperature of the machining fluid as a machining fluid state parameter and a flowmeter 16 for indicating the flow rate of the machining fluid as a machining fluid supply state parameter. Further, the operating sections of the machining fluid cooler on the panel 21 have various operating elements, including a power switch 17, a first setter 18 for setting a target temperature for a first operation mode in which the machining fluid temperature is adjusted to a target value, a second setter 19 for setting a target temperature difference for a second operation mode in which the temperature difference between the machining fluid temperature and the air temperature is adjusted to a target value, and a mode selector switch 20 used alternatively to select the first or second operation mode. The target temperature and the target temperature difference, along with the aforesaid machining fluid temperature and machining fluid flow rate, constitute operation parameters for the machining fluid cooler. In FIG. 3, numerals 22, 23 and 24 denote an air thermometer, an alarm buzzer, and a breaker, respectively.

The following is a description of the operation of the wire-cut electrical discharge machine with the aforementioned construction.

In starting the electrical discharge machining, an operator turns on various power switches for various parts of the electrical discharge machine, including the power switch 17 for the machining fluid cooler, and then selects the operation mode of the machining fluid cooler by operating the mode selector switch 20. If the first operation mode is selected, the operator sets the target temperature in the first setter 18. For high-accuracy electrical discharge machining, it is advisable to set the target temperature in consideration of the air temperature indicated on the air thermometer 22. Since the air thermometer 22 of the display section and the operating sections 17, 18 and 20 of the machining fluid cooler are arranged on the front of the control device 4 on the front side of the electrical discharge machine housing, the operator can easily turn on the power switch, select the operation mode, and set the temperature in the aforesaid manner.

During the electrical discharge machining, an electric discharge is caused in the gap between the workpiece 9 and the wire electrode 7 running along the wire transportation path. Also, the machining fluid from the machining fluid disposer 10 is supplied to the gap between the wire electrode 7 and the workpiece 9, the workpiece table 8 and its sourroundings and the workpiece 9, through one duct of the first duct pair 12 and the nozzles of the upper and lower guides 5 and 6, thereby cooling these elements. The machining fluid, having been used for the cooling, is returned to the machining fluid disposer 10 through the machining fluid collecting vessel 14 and the other duct of the first duct pair 12. After being cleaned in the disposer 10, the machining fluid is supplied to the machining fluid cooler body 3 through one duct of the second duct pair 11, whereupon it is cooled in the cooler body 3. Thereafter, the machining fluid is returned to the machining fluid disposer 10 through the other duct of the second duct pair 11.

During the electrical discharge machining, the operator monitors various operating parameters displayed on the display sections of the machining fluid cooler and which parameters are indicative of the operating state of the machining fluid cooler (machining fluid temperature and machining fluid flow rate indicated on the liquid thermometer 15 and the flowmeter 16, in this case). If any of the operating parameters greatly changes, the target temperature set in the first setter 18 is reset, or switches (not shown) for the adjustment of control parameters (e.g., control gain) for the machining fluid cooler operation, arranged on the front of the control device 4, are operated. Since the display sections 15 and 16, the operating section 18, etc. of the machining fluid cooler are located on the front of the control device 4, the operator can easily monitor and adjust the operation parameters. The control device 4 controls the machining fluid cooling operation, machining fluid flow rate adjusting operation, etc. of the cooler body 3 in accordance with the operation control parameters adjusted by the aforesaid operation.

If any of the various operation parameters of the machining fluid cooler, including the machining fluid temperature and the machining fluid flow rate, changes extraordinarily, an alarm is given from the buzzer 23. Since the buzzer 23 is located on the front of the control device 4, the alarm can never be missed.

In running the machining fluid cooler in the second operation mode, the mode selector switch 20 is operated. In this state, the operator sets the target temperature difference for the second operation mode in the second setter 19. The control device 4 controls the machining fluid cooling operation and the machining fluid flow rate adjusting operation of the cooler body 3 so that the difference between the machining fluid temperature and the air temperature is equivalent to the target temperature difference. In other respects, substantially the same processes as in the first operation mode are followed, so that a description of these processes is omitted.

The present invention is not limited to the embodiment described above, and various modifications may be effected therein. In the above embodiment, for example, the display sections and the operating sections of the machining fluid cooler are located on the front of the control device 4. Alternatively, however, they may be arranged in any othe suitable positions on the front side of the electrical dischage machine housing where the operator usually stands attendant. Although the present invention is applied to the a wire-cut electrical discharge machine in the above embodiment, it may be also applied to electrical discharge machines of other types. Furthermore, although the operation of the machining fluid cooler body is controlled by means of the control device 4, the machining fluid cooler body may be provided with a control unit for exclusive use. Further, the alarm buzzer may be replaced with any other alarm device, such as a lamp.

I claim:

1. An electrical discharge machine, comprising:
an electrical discharge machine housing; and
a machining fluid cooler including a display section for displaying at least one first operation parameter and an operating section for adjusting at least one second operation parameter, said display section and said operating section of said machining fluid cooler being located on a front side of said electrical discharge machine housing;

said machining fluid cooler further including a body positioned independently of said display section and said operating section, said machining fluid cooler body being located on a rear side of the electrical discharge machine housing;

said machining fluid cooler further being operable in either a first operation mode in which a machining fluid temperature is controlled to a target value or a second operation mode in which the temperature difference between the machining fluid temperature and the air temperature is contrlled to a target value, and said operating section includes a power switch for said machining fluid cooler, a switch for selecting either of said first and second operation modes, a first setter for setting the target temperature for said first operation mode, and a second setter for setting the target temperature difference for said second operation mode, and wherein said target temperature and said target temperature difference constitute said at least one second parameter.

2. An electrical discharge machine according to claim 10, wherein said display section of said machining fluid cooler displays a machining fluid state parameter and a machining fluid supply state parameter, both said state parameters constituting said at least one first parameter.

3. An electrical discharge machine according to claim 1, wherein said display section of said machining fluid cooler includes a liquid thermometer for indicating machining fluid temperature and a flowmeter for indicating machining fluid flow rate.

4. An electrical discharge machine according to claim 1, wherein said electrical discharge machine is a wire-cut electrical discharge machine.

5. An electrical discharge machine, comprising:

an electrical discharge machine housing;

a machining fluid cooler including a display section for displaying at least one first operation parameter and an operating section for adjusting at least one second operation parameter, said display section and said operating section of said machining fluid cooler being located on a front side of said electrical discharge machine housing; said machining fluid cooler further including a body positioned independently of said display section and said operating section, said machining fluid cooler body being located on a rear side of the electrial discharge machine housing; and a control device disposed so that the front thereof faces in the same direction as the front of said electrical discharge machine housing; said control device being adapted to control operation of various parts of said electrical discharge machine, and wherein said display section and said operating section of said machining fluid cooler are located on the front of said control device;

said machining fluid cooler further being operable in either a first operation mode in which a machining fluid temperature is controlled to a target value or a second operation mode in which the temperature difference between the machining fluid temperature and the air temperature is controlled to a target value, and said operating section includes a power switch for said machining fluid cooler, a switch for selecting either of said first and second operation modes, a first setter for setting the target temperature for said first operation mode, and a second setter for setting the target temperature difference for said second operation mode, and wherein siad target temperature and said target temperature difference cònsitutute said at least one second parameter.

* * * * *

UNITED STATES PATENT AND TRADEMARK OFFICE
CERTIFICATE OF CORRECTION

PATENT NO. : 5,175,408

DATED : December 29, 1992

INVENTOR(S) : HIDENORI TAKASHIMA

It is certified that error appears in the above-identified patent and that said Letters Patent is hereby corrected as shown below:

[57] Abstract, line 12, "temperture" should be --temperature--.

Column 1, line 41, "temmperature" should be --temperature--.

Column 3, line 4, "cooler" should be --cooling--;

line 59, "sourroundings" should be --surroundings--.

Column 4, line 51, "othe" should be --other--;

line 54, delete "the".

Column 5, line 15, "contrlled" should be --controlled--;

line 27, "10" should be --1--.

Column 6, line 13, "electrial" should be --electrical--;

UNITED STATES PATENT AND TRADEMARK OFFICE
CERTIFICATE OF CORRECTION

PATENT NO. : 5,175,408

DATED : December 29, 1992

INVENTOR(S) : Hidenori Takashima

It is certified that error appears in the above-indentified patent and that said Letters Patent is hereby corrected as shown below:

Col. 6, line 36, "siad" should be --said-- line 37, "consitutute" should be --constitute--

Signed and Sealed this

Sixteenth Day of November, 1993

Attest:

BRUCE LEHMAN

*Attesting Officer*     *Commissioner of Patents and Trademarks*